United States Patent Office 2,871,206
Patented Jan. 27, 1959

2,871,206

TREATMENT OF RECLAIMED RUBBER

Ivan Mankowich, Cheshire, Leo E. Steinle, Beacon Falls, and Frank P. Chiavetta, West Cheshire, Conn., assignors to United States Rubber Company, New York, N. Y., a corporation of New Jersey No Drawing. Application May 21, 1954
Serial No. 431,591

4 Claims. (Cl. 260—5)

This invention relates to the treatment of reclaimed rubber, and more particularly to reduce the staining or discoloring characteristics thereof.

Practically all reclaimed rubbers have the common property of staining other lighter colored objects and materials with which they come in contact. For many uses such staining is quite harmful and, if not overcome, seriously restricts the use of the reclaim. This problem is particularly acute in white sidewall tires. For example, certain components of the original rubber compound, such as accelerators and antioxidants, are normally staining ingredients in the reclaim, and when used in a tire carcass adjacent to the white sidewall layer, causes discoloration and staining. This action is often accelerated upon exposure to light, especially sunlight. The reclaimer, confronted with a raw material of unknown history, finds it difficult, if not impossible, and expensive, to make a distinction between scraps containing staining chemicals and those that do not. The practice in the industry for the preparation of best grade non-staining reclaim types include careful selection of scrap to insure use of natural rubber and to avoid the presence of synthetic rubbers known to contain staining materials to a greater degree than natural rubber scraps. Often this requires costly procedures. The situation with regard to the use of natural rubber, as developments occur in the rubber industry, shows definite trends towards an increase in the use of synthetic rubber with an eventual diminution of available natural rubber scrap as a consequence.

We have discovered how to treat synthetic rubber-containing reclaim made by the conventional rubber reclaiming process, such as the "digester" process, the "heater" process, or the so-called "mechanical" process, with a chemical that effectively reduces the staining or discoloring characteristics of the reclaim.

In the usual "digester" process, a charge of ground vulcanized rubber scrap and about 100 to 300 parts by weight of water per 100 parts of scrap, or a solution of a cellulose-destroying chemical, such as caustic soda, calcium chloride, or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried, or somewhat moistened condition (about 1 to 10 parts by weight of water per 100 parts of scrap), is heated with live steam under pressure in trays or pans in an autoclave until the rubber becomes plasticized. The plasticized scrap is then removed from the "heater" and milled. The so-called mechanical process is essentially a mechanical working of the dry rubber scrap at elevated temperature, as in the "Hot Banbury" process or in the "Reclaimator" process. The reclaiming in the "digester" or "heater" or so-called mechanical process may take place at the usual reclaiming temperatures of at least 300° F. In general, the "digester" and "heater" reclaiming takes place at temperatures from about 300° F. to about 420° F., and the temperature of the mechanical reclaiming process may go higher to about 550° F. In these processes, the ground scrap may be mixed with conventional cellulose-destroying chemicals or defiberizing agents, softening oils, plasticizers or chemical reclaiming agents, which of course should be non-staining, before reclaiming, i. e., before heating for a time sufficient to materially soften the scrap and convert the rubber into a plastic material that is capable of being revulcanized.

In carrying out the present invention, the reclaim, the rubber content of which may comprise 5% to 100% devulcanized synthetic rubber and correspondingly 95% to 0% devulcanized natural rubber, is treated with certain aldehydes at temperatures below those used in conventional reclaiming processes, viz., from room temperature (60° F.) to less than 300° F. The method of reclaiming scrap rubber in the presence of aldehydes or treating the reclaim at temperatures of 300° F. and over is described and claimed in our copending application Serial No. 431,592 filed concurrently with this application. The aldehyde may be formaldehyde, paraformaldehyde, methylal, acetaldehyde, paraldehyde, acrolein, chloral or aldol. The aldehyde will form non-staining reaction products with the normally staining ingredients of the reclaim. Thus the aldehyde used for treating the reclaim should not be combined with other materials, as in the condensation or reaction products of aldehydes with hydrazines or amines, which are known reclaiming aids but which do not reduce the staining characteristics of the reclaim. Also, the presence of a free aldehyde group alone in a compound does not necessarily impart non-staining characteristics; e. g., isobutyraldehyde, heptaldehyde, furfural and benzaldehyde do not give non-staining reclaims. The amount of aldehyde used to effectively reduce the staining properties of the reclaim is not critical, and generally will be in the range from 0.2% to 35%, and preferably from 3% to 5%, based on the weight of the reclaim.

The synthetic rubber in the scrap that may be treated according to the present invention may be the product of the emulsion polymerization in the presence of a free radical catalyst of the peroxide or azo type of one or more butadienes-1,3, for example, butadiene-1,3, 2-methyl-butadiene-1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubber copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. Common commercial synthetic rubbers of this type are GR–S (copolymer of a major proportion of butadiene and a minor proportion of styrene), Paracril (copolymer of a major proportion of butadiene and a minor proportion of acrylonitrile), and neoprene (polymerized chloro-2-butadiene-1,3). The synthetic rubber may also be the product of the polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is Butyl rubber which is a copolymer of about 96 to 99.5 parts of isobutylene and correspondingly 4 to 0.5 parts of isoprene.

The following examples illustrate the invention. All parts and percentages referred to herein are by weight:

Example I

One hundred parts of cracked whole tire fiber-containing scrap in which the rubber content was about 40% GR-S and 60% natural rubber, were mixed with 18.5 parts of non-staining rubber softening oils (terpenes and mineral spirits), 10.5 parts of non-staining plasticizer (pine products-gum and wood rosin), 4.8 parts of calcium chloride, and 225 parts of water. The charge was loaded into a jacketed, agitated autoclave and heated five hours at about 200 pounds per square inch jacket pressure (about 388° F.) After the five hour reclaiming period, the autoclave contents were blown down and washed. Various 4500 grams (dry weight) samples of the washed reclaim particles were treated in a seven and one-half gallon jacketed autoclave for one hour with 935 grams of 37% formaldehyde in 11,000 grams of water at various temperatures, viz., 70° F., 100° F., 125° F., 150° F., 210° F. and 285° F. The thus treated reclaims and an untreated control or check reclaim sample were each compounded with 3 parts of additional non-staining plasticizer and 5 parts of activated carbon. Sufficient of the thus compounded reclaims to provide 100 parts of rubber hydrocarbon content were then compounded with 5 parts of zinc oxide, 2 parts of stearic acid, 3 parts of sulfur, 0.5 part of mercaptobenzothiazole, and 0.2 part of diphenyl guanidine, and were vulcanized for 25 minutes at 287° F. in sheet form 0.1" thick.

Test strips 1" x 4" x 0.1" thick were cut from the cured reclaim samples, dipped in a white lacquer "Body White High Gloss Lacquer DHL-8000" (manufactured by Pittsburgh Plate Glass Co., Ditzler Color Division), and hung to drain and dry for one hour. The test strips were then exposed to the light of two GE-RS, 275 watt sun lamps (bottom of the lamps being 15" from the surface to be exposed) placed so that the center of each lamp was over the desired center of exposure. The test samples were placed, narrow edge in, on a 12" diameter table rotating at 2 R. P. M. Masking strips, circular, approximately 2" wide and 11" and 5" in diameter, respectively, were then placed and clamped on the samples. The exposed area was between the two masking strips. The entire system was enclosed and vented using a blower for circulation of air. Test strips were exposed to the sun lamps for 20 minutes and 60 minutes, respectively. The exposed strips were then examined under the test light of a Model #610, Serial #2520, Photovolt Corp. Reflectance Meter. The reflectance meter was calibrated with a standard block of known reflectance, and readings on the exposed samples were taken directly. The whiter the stock, the brighter the reflectance. This is reported as percentage, 100% being standard for the control or check sample any value above 100% is an improvement.

The following table shows the results of reflectance measurements on the treated samples.

| Temperature of Aldehyde Treatment | Reflectance (percent) | |
|---|---|---|
| | 20 min. Exp. | 60 min. Exp. |
| 70° F | 101.4 | 103.0 |
| 100° F | 101.4 | 102.1 |
| 125° F | 101.4 | 103.6 |
| 150° F | 102.0 | 105.0 |
| 210° F | 106.0 | 112.0 |
| 285° F | 107.8 | 113.0 |
| None (Control) | 100 | 100 |

Example II

Other 4500 gram samples of the dried reclaim particles made according to Example I were treated in a seven and one-half gallon jacketed autoclave for one hour with 362 grams of paraformaldehyde and 640 grams of acetone at 160° F. and 195° F. respectively. Reflectance tests on the thus treated reclaims and an untreated control or check reclaim sample, compounded and cured similarly to Example I, gave the results set forth in the following table:

| Temperature of Aldehyde Treatment | Reflectance (percent) | |
|---|---|---|
| | 20 min. Exp. | 60 min. Exp. |
| 160° F | 104.0 | 107.2 |
| 195° F | 106.6 | 112.9 |
| None (Control) | 100 | 100 |

Other organic solvent media, e. g., hydrocarbons, carbon tetrachloride, mineral spirits, benzene, terpenes, etc. may be employed with the aldehyde in treating the reclaim according to the present invention.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of improving the non-staining properties of a reclaimed scrap vulcanized rubber, the rubber content of which is selected from the group consisting of synthetic rubber and mixtures of synthetic rubber with up to 95% by weight of such mixtures of natural rubber, which comprises subjecting said reclaimed rubber, after it has been reclaimed, to treatment at temperatures in the range from 60° F. to less than 300° F. with a chemical in the free state selected from the group consisting of formaldehyde, paraformaldehyde, methylal, acetaldehyde, paraldehyde, acrolein, chloral and aldol, thereby forming in-situ non-staining reaction products of normally staining accelerator and antioxidant ingredients of the reclaim with said chemical, said synthetic rubber being selected from the group consisting of homopolymers of butadienes-1,3, copolymers of mixtures containing butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

2. The method of improving the non-staining properties of a reclaimed scrap vulcanized rubber, the rubber content of which is selected from the group consisting of synthetic rubber and mixtures of synthetic rubber with up to 95% by weight of such mixtures of natural rubber, which comprises subjecting said reclaimed rubber, after it has been reclaimed, to treatment at temperatures in the range from 60° F. to less than 300° F. with formaldehyde, thereby forming in-situ non-staining reaction products of normally staining accelerator and antioxidant ingredients of the reclaim with said formaldehyde, said synthetic rubber being selected from the group consisting of homopolymers of butadienes-1,3, copolymers of mixtures containing butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

3. The method of improving the non-staining properties of a reclaimed scrap vulcanized rubber, the rubber content of which is selected from the group consisting of synthetic rubber and mixtures of synthetic rubber with up to 95% by weight of such mixtures of natural rubber, which comprises subjecting said reclaimed rubber, after it has been reclaimed, to treatment at temperatures in the range from 60° F. to less than 300° F. with water and a chemical in the free state selected from the group consisting of formaldehyde, paraformaldehyde, methylal, acetaldehyde, paraldehyde, acrolein, chloral and aldol, thereby forming in-situ non-staining reaction products of normally staining accelerator and antioxidant ingredients of the reclaim with said chemical, said synthetic rubber being selected from the group consisting of homopolymers of butadienes-1,3, copolymers of mixtures containing butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

4. The method of improving the non-staining properties of a reclaimed scrap vulcanized rubber, the rubber content of which is selected from the group consisting of synthetic rubber and mixtures of synthetic rubber with up to 95% by weight of such mixtures of natural rubber, which comprises subjecting said reclaimed rubber, after it has been reclaimed, to treatment at temperatures in the range from 60° F. to less than 300° F., with water and formaldehyde, thereby forming in-situ non-staining reaction products of normally staining accelerator antioxidant ingredients of the reclaim with said formaldehyde, said synthetic rubber being selected from the group consisting of homopolymers of butadienes-1,3, copolymers of mixtures containing butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

References Cited in the file of this patent
UNITED STATES PATENTS

| | | |
|---|---|---|
| 1,532,213 | Winkelmann | Apr. 7, 1925 |
| 2,321,114 | Teft | June 8, 1943 |
| 2,343,559 | Kirby et al. | Mar. 7, 1944 |
| 2,378,199 | D'Alelio | June 12, 1945 |
| 2,427,063 | Mighton et al. | Sept. 9, 1947 |
| 2,609,359 | Sparks et al. | Sept. 2, 1952 |
| 2,611,760 | Geiser | Sept. 23, 1952 |
| 2,640,035 | Brown et al. | May 26, 1953 |
| 2,653,916 | Elgin et al. | Sept. 29, 1953 |
| 2,794,006 | Naudain et al. | May 28, 1957 |